United States Patent
Kawaoka

(10) Patent No.: US 6,342,883 B1
(45) Date of Patent: Jan. 29, 2002

(54) IMAGE DISPLAY METHOD AND IMAGE DISPLAY APPARATUS

(75) Inventor: Ichiro Kawaoka, Tokyo (JP)

(73) Assignee: Sega Enterprises, Ltd. (JP)

( * ) Notice: Subject to any disclaimer, the term of this patent is extended or adjusted under 35 U.S.C. 154(b) by 0 days.

(21) Appl. No.: 09/265,894

(22) Filed: Mar. 11, 1999

(30) Foreign Application Priority Data

Mar. 12, 1998 (JP) ............................................. 10-061758

(51) Int. Cl.[7] .................................................. G06T 17/00
(52) U.S. Cl. ......................................... 345/420; 345/441
(58) Field of Search ................................... 345/420, 441

(56) References Cited

U.S. PATENT DOCUMENTS 5,821,940 A * 10/1998 Morgan et al. ............. 345/420
5,844,563 A * 12/1998 Harada et al. .............. 345/420
6,040,836 A * 3/2000 Shiitani et al. ............. 345/427

FOREIGN PATENT DOCUMENTS

JP          4-242870         8/1992

* cited by examiner

Primary Examiner—Mark Zimmerman
Assistant Examiner—Enrique L Santiago
(74) Attorney, Agent, or Firm—Dickstein Shapiro Morin & Oshinsky LLP

(57) ABSTRACT

There is provided an image display method for displaying an object constituted by a plurality of polygons comprising the steps of: providing coordinate data for each vertex included in a plurarity of polygons; and expressing data of a vertex in common to a plurality of polygons by the coordinate data of the common vertex and position data for designating a position of the coordinate data of the common vertex.

3 Claims, 6 Drawing Sheets

FIG. 2A

Polygon A = ( x0, y0, z0 )  · · · ( a 1 )
          ( x1, y1, z0 )  · · · ( a 2 )
          ( x2, y2, z2 )
Polygon B = (   -9   )  · · · ①
          ( x3, y3, z3 )
          (   -10   )  · · · ②
Polygon C = (   -14   )  · · · ③
          (   -9   )  · · · ④
          (   -6   )  · · · ⑤
Polygon D = (   -14   )  · · · ⑥
          (   -8   )  · · · ⑦
          (   -13   )  · · · ⑧

FIG. 2B

Polygon A = ( x0, y0, z0 )  · · · ( a 1 )
          ( x1, y1, z1 )  · · · ( a 2 )
          ( x2, y2, z2 )
Polygon B = ( x0, y0, z0 )  · · · ( b 1 )
          ( x3, y3, z3 )
          ( x1, y1, z1 )  · · · ( b 2 )
Polygon C = ( x0, y0, z0 )
          ( x2, y2, z2 )
          ( x3, y3, z3 )
Polygon D = ( x1, y1, z1 )
          ( x3, y3, z3 )
          ( x2, y2, z2 )

x0, y0, z0, x1, y1, z1, x2, y2, z2, x0, y0, z0

-9 -8 -7 -6 -5 -4 -3 -2 -1  0 +1 +2 x0, y0, z0, x1, y1, z1, x2, y2, z2, -9, x3, y3, z3, -10

-10 -9 -8 -7 -6 -5 -4 -3 -2 -1  0

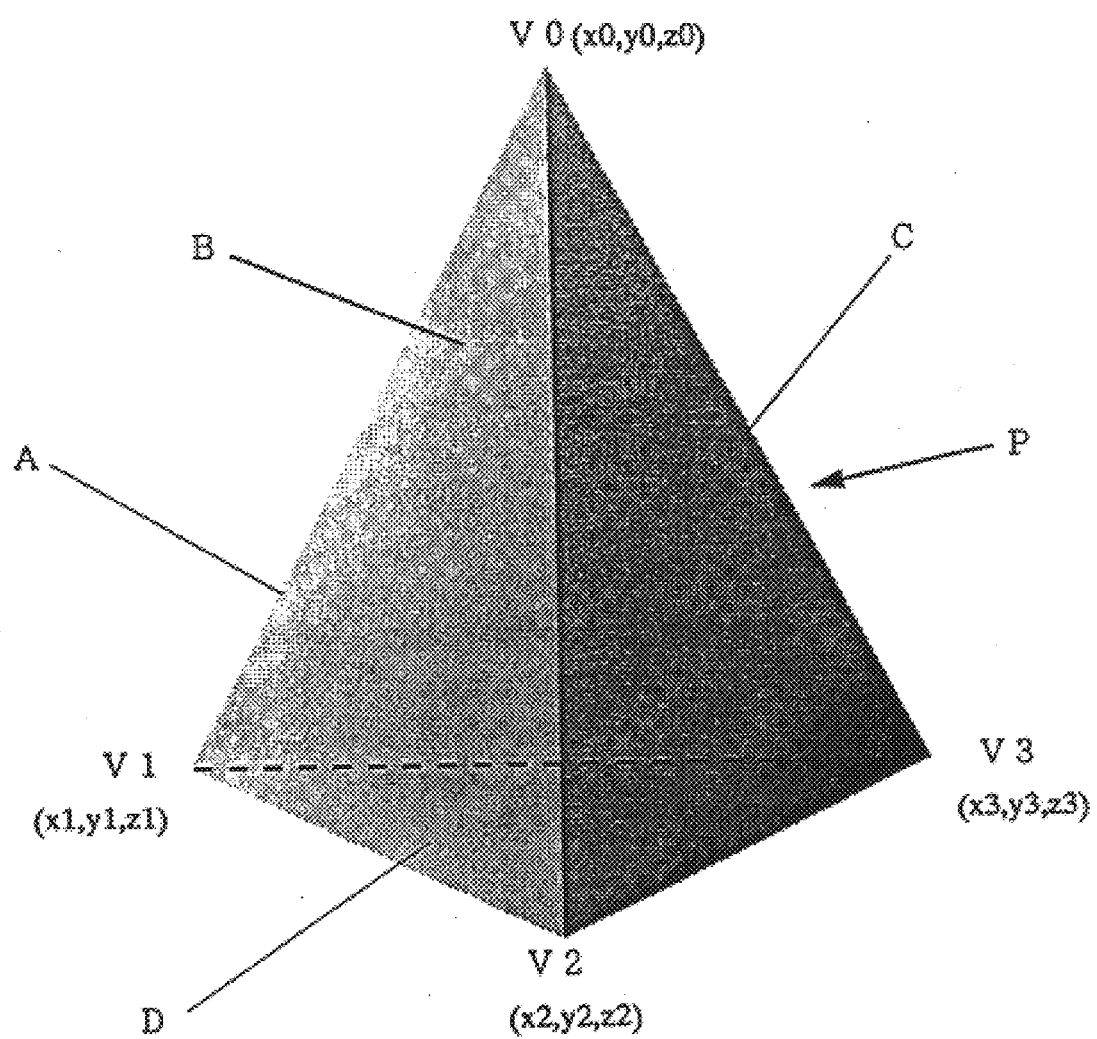

IMAGE DISPLAY METHOD AND IMAGE DISPLAY APPARATUS

BACKGROUND OF THE INVENTION

1. Field of the Invention

The present invention relates to an image display method, for computer graphics (CG), for displaying an object constituted by polygons and an image display apparatus therefor.

2. Related Arts

According to the techniques for computer graphics (CG), an object in virtual three-dimensional space is constituted by at least one polygon. The object data consists of a set of polygon data, including vertex data for the polygon, and the polygon data are stored on a storage medium, such as a CD-ROM. When an image display apparatus reads the polygon data from the storage medium, the coordinates of the polygon data are transformed, which is required for the rendering process (a geometry process). At this time, the polygon data are sequentially read from the storage medium an transmitted to a geometry processing unit, which is provided in the image display apparatus and which performs the geometry process. Then, the geometry processing unit performs a predetermined coordinate transformation.

Conventionally, two formats are employed for the polygon data stored in the storage medium. FIG. 6 is a diagram employed for explaining the conventional formats used for polygon data. An explanation will now be given of the format employed for data for four triangular polygons, A, B, C and D, which constitute, as an object, a tetrahedron P, and for which vertexes are used in common.

In FIG. 6, the tetrahedron P has four vertexes, V0, V1, V2 and V3. The vertexes V0, V1, V3 and V3 are presented as vertex coordinate data by employing three-dimensional coordinates, which are defined as V0=(x0, y0, z0),
V1=(x1, y1, z1),
V2=(x2, y2, z2),
V3=(x3, y3, z3).

With a conventional first format (hereinafter referred to as an index format), the vertex data for the individual polygons consist of the vertex coordinate data for the individual vertexes and the following vertex string data. That is, polygon A=(V0, V1, V2),
polygon B=(V0, V3, V1),
polygon C=(V0, V2, V3),
polygon D=(V1, V3, V2).

Therefore, the triangular polygons A, B, C and D are defined by the vertex string data for three vertexes.

The vertexes in the vertex string data are transmitted to the geometry processing unit, beginning with the vertex string data for polygon A, in the order of V0, V1, V2, V0, V3, V1, V0, V2, . . . . Upon receiving each vertex, the geometry processing unit refers to the vertex coordinate data and reads from that data the coordinates of a vertex. The geometry processing unit, in accordance with the vertex coordinate data, then performs a predetermined coordinate transformation.

When the polygons, as in the tetrahedron P, are located adjacent to each other, and their vertexes are commonly employed, in the index format the vertex coordinate data are not provided for each of the vertexes which are received. Thus, the amount of required polygon data can be reduced.

However, since each time a vertex is received the corresponding vertex coordinate data must be referred to, the speed attained by geometry processing is reduced.

With a conventional second format (hereinafter referred to as a beta format), the vertex data for the individual polygons are provided directly as vertex coordinate data for the vertexes included in the vertex string data. That is, the polygon data are defined as polygon A=(x0, y0, z0), (x1, y1, z1), (x2, y2, z2),
polygon B=(x0, y0, z0), (x3, y3, z3), (x1, y1, z1),
polygon C=(x0, y0, z0), (x2, y2, z2), (x3, y3, z3),
polygon D=(x1, y1, z1), (x3, y3, z3), (x2, y2, z2).

The geometry processing unit performs a predetermined coordinate transformation for each of vertex coordinates which are input, beginning with the vertex coordinates of the polygon A, in the order x0, y0, z0, x1, y1, z1, x2, y2, z2, z0, y0, z0, x3, y3, z3, x1, y1, z1, . . . .

In the beta format, the vertex data for the polygon data are provided as a set of vertex coordinate data. Therefore, since the geometry processing unit need not refer to the vertex coordinate data as in the index format, the vertex coordinate data, which are sequentially received, can be processed at high speed.

However, when as is described above the vertexes of adjacent polygons are employed in common, the coordinate data for the overlapping vertexes are increased, so that an enormous amount of polygon data is required.

As is described above, according to the index format, the processing speed can not be increased because the vertex coordinate data must be referred to, even though the amount of polygon data can reduced. According to the beta format, an enormous amount of polygon data is required, even though the processing speed can be increased.

SUMMARY OF THE INVENTION

It is, therefore, one objective of the present invention to provide an image display method using a new format according to which a high processing speed can be maintained and the amount of data can be reduced, and an image display apparatus therefor.

To achieve the objective, according to the present invention, it is provided an image display method for displaying an object constituted by a plurality of polygons comprising the steps of:

providing coordinate data for each vertex included in a plurarity of polygons; and expressing data of a vertex in common to a plurarity of polygons by the coordinate data of the common vertex and position data for designating a position of the coordinate data of the common vertex.

Coordinate data designated by the position data, or data which is coordinate-transformed from coordinate data designated by the position data is used as the coordinate data of the common vertex corresponding to the position data.

Preferably, the coordinate data of the common vertex is read out earlier than the position data is read out.

Further, to achieve the above objective, according to the present invention, it is provided a first image display apparatus for displaying an object constituted by a plurality of polygons comprising:

a memory for storing data of vertex in common to a plurarity of polygons as a coordinate data of the common vertex and position data for designating a position of the coordinate data of the common vertex; and a coordinate-transformer for coordinate-transforming the coordinate data of the common vertex and coordinate data designated by the position data corresponding to the common vertex.

In addition, to achieve the above objective, according to the present invention, it is provided a second image display apparatus for displaying an object constituted by a plurality of polygons comprising:

a memory for storing data of vertex in common to a plurarity of polygons as a coordinate data of the common vertex and position data for designating a position of the coordinate data of the common vertex; and a coordinate-transformer for coordinate-transforming the coordinate data of the common vertex and using the coordinate-transformed instead of coordinate-transforming coordinate data disignated by the position data corresponding to the common vertex.

It is preferable that the coordinate data of the common vertex is inputted to the coordinate-transformer unit earlier than the position data is inputted.

Further, according to the present invention, provided is a memory medium storing data for displaying an object constituted by a plurality of polygons, vertex data of a vertex in common to a plurarity of polygons included in the data comprising;

coordinate data of the common vertex; and position data for designating a position of the coordinate data of the common vertex.

BRIEF DESCRIPTION OF THE DRAWINGS

FIGS. 2A and 2B are diagrams for explaining the format for the vertex data for a polygon according to the embodiment of the present invention;

FIG. 6 is a diagram showing as an object a tetrahedron P which is constituted by the triangular polygons A, B, C and D for which vertexes are employed in common.

DETAILED DESCRIPTION OF THE PREFERRED EMBODIMENTS

The preferred embodiments of the present invention will now be described. It should be noted, however, that the technical scope of the present invention is not limited to these embodiments.

Figure 1:
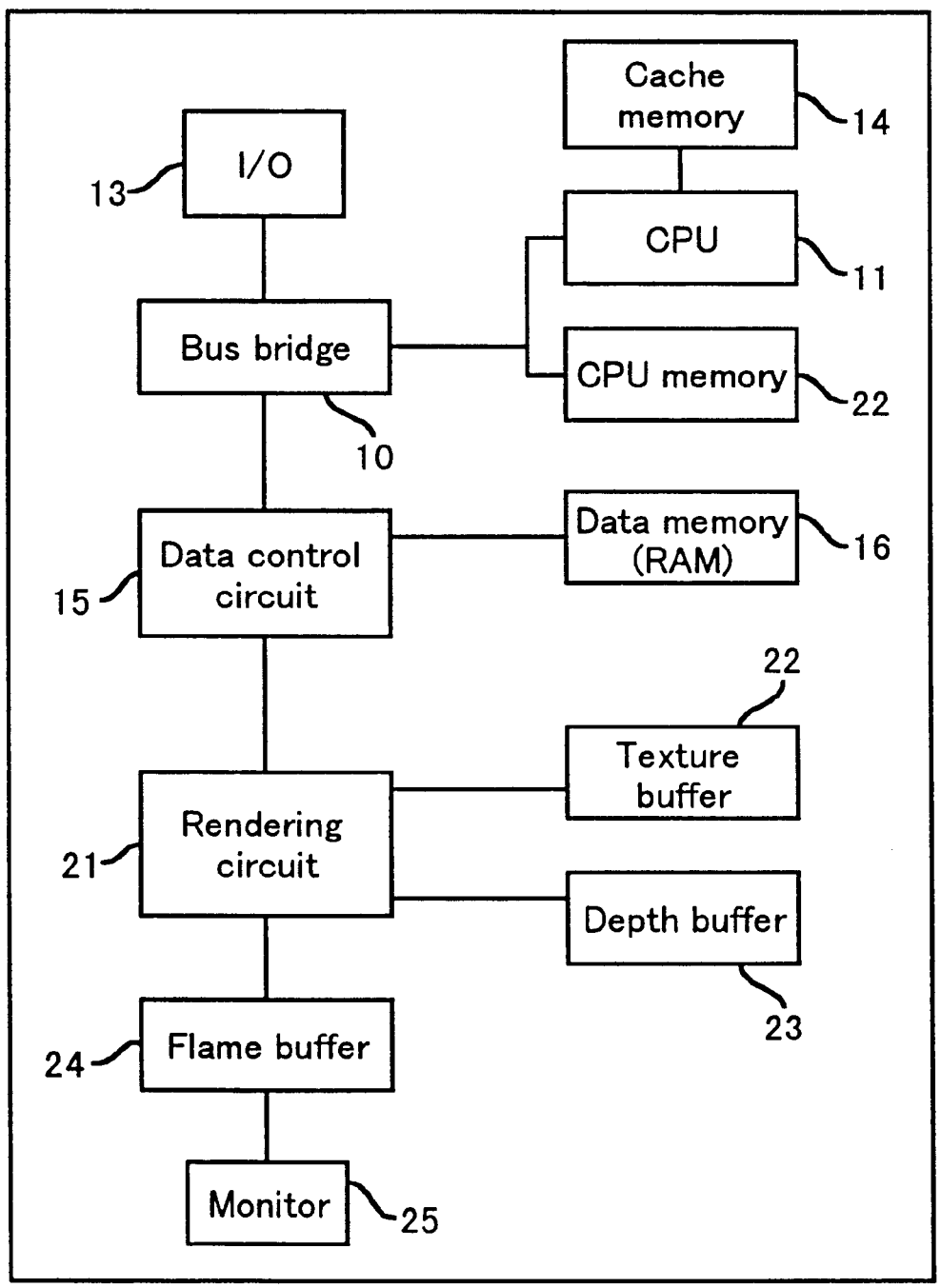
FIG. 1 is a block diagram illustrating the arrangement of an image display apparatus according to one embodiment of the present invention.

FIG. 1 is a block diagram illustrating the arrangement of an image display apparatus according to one embodiment of the present invention. In FIG. 1, in the image display apparatus a CPU 11 and a CPU memory 22, including a BIOS-ROM, communicate with an I/O interface 13 across a bus bridge 10. A cache memory 14 which the CPU 11 can access fast is incorporated in or connected to the CPU 11.

When power is turned on and the BIOS for the CPU memory 12 is activated, program data stored in an external memory (not shown), such as a CD-ROM, are read through the I/O interface 13 by the CPU 11, and via a data control circuit 15 are stored in a data memory 16.

The data stored in the data memory (RAM) 16 include a register set function and data for a plurality of polygons, which constitute a plurality of objects to be displayed on a monitor 25 by the program. The polygon data include vertex data for polygons (vertex coordinates, vertex color, texture map coordinates, transparency, normal line vectors, etc.).

The polygon data in the data memory 16 are transmitted to the CPU 11 by the data control circuit 15, and the CPU 11 performs a geometry process. Specifically, the CPU 11 employs the vertex coordinates of the polygon to position it in a predetermined virtual three-dimensional space. A viewport is determined to define the area in three-dimensional virtual space which is to be displayed, and the luminance of the polygon is calculated in accordance with the normal line vector. The vertex coordinates of the parts of a polygon which extend outside the viewport are removed, i.e., clipping is performed.

The vertex coordinates of the polygon which are located inside the viewport are transformed into three-dimensional coordinates of a viewpoint system which employs a predetermined viewpoint.

The polygon data, to which has the three-dimensional vertex coordinates of the viewpoint system apply, are transmitted to a rendering circuit 21. The rendering circuit 21 includes a painting circuit, a texture pasting circuit, a depth comparison circuit and a blending circuit (none of them shown), which together constitute an image processor.

The painting circuit calculates such information as the coordinates of the pixels which lie within the range enclosed by the vertexes of a polygon, and transmits the obtained information to the other circuits in the rendering circuit 21.

The texture pasting circuit reads from a texture map, which is stored in a texture buffer 22, texture data corresponding to the individual pixels, and pastes the texture on the pixels. The texture data include color information (red, green and blue information) and transparency information.

The depth (Z direction) comparison circuit compares the positional relationship of a plurality of polygons. When writing in the depth buffer is not performed, the blending circuit blends the colors of the pixels which overlap at the same X and Y coordinates in the order in which these polygons were drawn.

The pixel data thus processed by the rendering circuit 21 are transmitted to a frame buffer 24, in which data for one screen of the monitor 25 are stored. The pixel data stored in the frame buffer 24 are sequentially transmitted to the monitor 25 to display as images.

FIGS. 2A and 2B are diagrams for explaining the format of vertex data for a polygon according to the embodiment of the present invention. In FIG. 2A is shown an example format in this embodiment, and in FIG. 2B is shown a conventional beta format rearranged to reflect the same form as that in FIG. 2A, in order that the two formats can be compared. The example format in FIG. 2A corresponds to the polygons, A, B, C and D, which constitute the tetrahedron P in FIG. 6.

For the format in the embodiment shown in FIG. 2A, the conventional beta format is basically employed. Instead of the vertex coordinate data, pointer data (position data) (1) to (8), which indicate the positions of the vertex coordinate data which have been processed, are provided for the positions of the overlapped vertex coordinates. The pointer data are position data used to instruct the reading of the vertex coordinate data which have previously been positioned in accordance the numbers as shown.

Figure 3A:
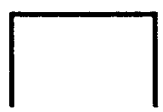
FIGS. 3A and 3B are diagrams for explaining pointer data.
Figure 3A:
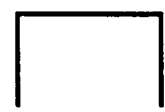
Figure 3A:
Figure 3A:
Figure 3B:
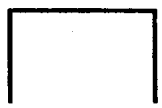
Figure 3B:
Figure 3B:
Figure 3B:
Figure 3B:

FIGS. 3A and 3B are diagrams for explaining the numerals indicated by the pointer data with FIG. 3A being an explanatory diagram for pointer data (1). In FIG. 3A, the vertex data (x0, y0, z0) (a) for the polygon A in FIG. 2B and the vertex coordinate data (z0, y0, z0) (b1) for the polygon B, which correspond to the pointer data (1), are arranged in order.

Since an x coordinate, a y coordinate and a z coordinate of the vertex are provided as data having the same byte count (e.g., four bytes), each coordinate composed of four bytes can be counted as one set of data (hereinafter referred to as a data unit).

The x coordinate x0 of the vertex (b1) of the polygon B is the same as the x coordinate x0 of the vertex (a1) of the polygon A which constitutes the data at a position situated nine units before. The same procedure is applied for the y coordinate and the z coordinate. Instead of the vertex coordinates (x0, y0, z0) (b1) of the polygon B, provided for the CPU 11 are the pointer data -9 (1), which designate reading of the data at the position situated nine units before. Then, the CPU 11 reads out the vertex coordinates (x0, y0, z0) (b1) of the polygon B from the cache memory 14.

The vertex coordinate data for which the CPU 11 has performed the geometry process are temporarily stored in the cache memory 14. Therefore, when there are overlapping vertex coordinates, the CPU 11 reads out from the cache memory 14 the vertex coordinate data at a position designated by the pointer data, instead of the vertex coordinate data being transmitted to the CPU 11. As a result, the amount of polygon data required can be reduced. At this time, since the CPU 11 can access the cache memory 14 at a high speed, high-speed processing can be maintained.

More specifically, the vertex coordinates can be represented by a combination of the x coordinate, y coordinate and z coordinate. The y coordinate y0 and z coordinate z0 of the vertex coordinates (x0, y0, z0) (b1) of the polygon B are the same as those of the vertex coordinates (x0, y0, z0) (a1) of the polygon A. The overlapping vertex coordinates have the same x coordinate, y coordinate and z coordinate. Therefore, when the location of data to be read out is instructed by the pointer data, the three sequential data sets are automatically read out from the instructed data and the vertex coordinates consisting of the x, y and z coordinates can be obtained.

At this time, the pointer data are provided using the same amount of data (e.g., four bites) as is used for the x, y and z coordinates of the vertex coordinates. Therefore, when the pointer data are employed instead of the x, y and z coordinates of the vertex coordinates, the amount of polygon data can be considerably reduced.

As a result, a larger amount of polygon data can be stored in the data memory (RAM) 16 having a predetermined memory capacity. Thus, a longer course can be set for a race in a computer game. And in an RPG (role playing game), a large map can be set up without data having to be read out from an external storage medium, such as a CD-ROM.

FIG. 3B is a diagram for explaining polygon data (2). In FIG. 3B, data are arranged sequentially beginning with the vertex coordinates (x1, y1, z1) (a2) of the polygon A in FIG. 2B and extending to pointer data (2) which corresponds to the vertex coordinates (x1, y1, z1) (b2) of the polygon B, which are the same as those of the polygon A.

The x coordinate x1 in the vertex coordinates (x1, y1, z1) (a2) of the polygon A is a data unit situated 10 units before the pointer data (2). Therefore, the data situated ten data units before the pointer data (2) are designated by the pointer data (2) (-10), and the three sequential data units are read out from that position. As a result, the vertex coordinates (x1, y1, z1) (b2) of the polygon B can be obtained, the pointer data (1) being counted as a single data unit. Similarly, when compared with the beta format, the pointer data (3), (4), (5), (6), (7) and (8) correspond to (-14), (-9), (-6), (-14), (-8) and (-13), respectively.

According to the format of this embodiment, the polygon data for the tetrahedron P consist of 20 data units, 12 data units of which are the vertex coordinates data and 8 data units of which are pointer data. In the conventional index format, the polygon data for the tetrahedron P consist of 24 data units, 12 data units of which are vertex coordinate data and 12 data units of which are vertex string data. Further, in the conventional beta format, the polygon data for the tetrahedron P consist of 36 data units, all of which are vertex coordinate data.

According to the embodiment of the present invention, the amount of polygon data can be reduced, compared with that required for the index format, and considerable data compression can be realized. In addition, since data stored in the cache memory which can be accessed by the CPU 11 at high speed are employed as the vertex coordinate data to be accessed by using pointer data, the high-speed geometry process can be maintained.

Figure 4:
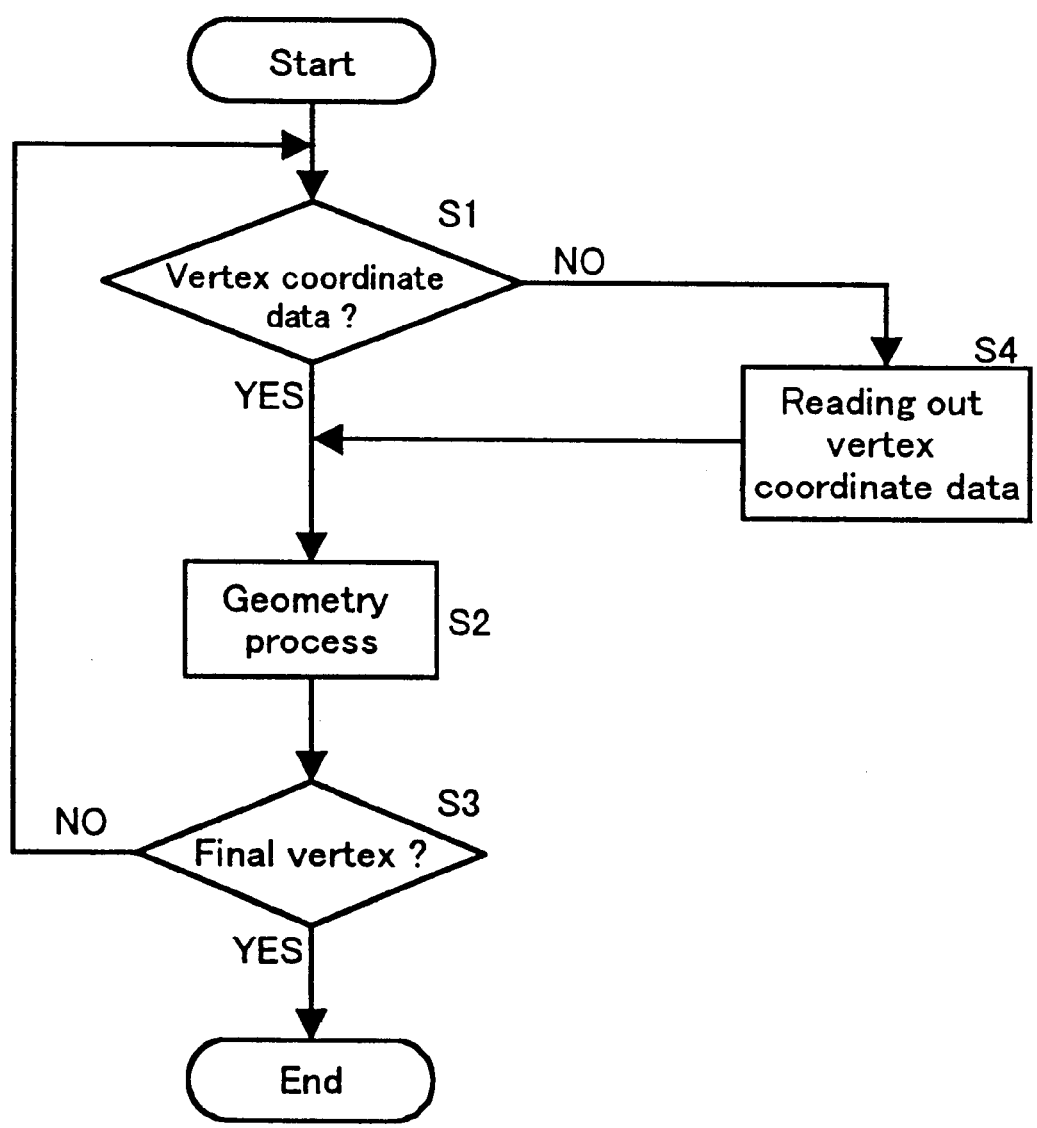
FIG. 4 is a flowchart showing the processing according to the embodiment of the present invention.

FIG. 4 is a flowchart showing the processing performed for the embodiment of the present invention. At step S1, a check is performed to determine whether the data unit input to the CPU 11 is vertex coordinate data or pointer data. For this determination, a flag is employed which is set at the least significant bit (LSB) of each data unit input to the CPU 11. Specifically, when the flag indicates "1," it is ascertained that the data unit is vertex coordinate data. When the flag indicates "0," it is ascertained that the data unit is pointer data.

The digital values which are four times the individual values of the pointer data are arranged for bits of the data units each of which consist of four bytes, so that the bits at the two lowest digits of each data unit can always be set to 0. Therefore, when the flag information is provided for the bits and the value of the least significant bit of the unit data, which is pointer data, is set to "1," the type of unit data can be identified. The least significant bit of the vertex coordinate data is set to "0," regardless of its value. However, the least significant bit of the vertex coordinate data has affect on the value of the vertex coordinates.

When, at step S1, the input data are vertex coordinate data, the CPU 11 performs a predetermined geometry process (step S2). When the input data are pointer data, the CPU 11 reads out, from the cache memory 14, the vertex coordinate data situated before the number of units which is instructed by the pointer data (step S4). The CPU 11 then performs the predetermined geometry process for the obtained vertex coordinate data (step S2).

If, in the geometry process, the vertex coordinate data which have not been clipped are to be read out from the cache memory 14, the process at step S2 can be omitted by reading out the vertex coordinate data for which the geometry process has been performed. By this, the processing speed can be further increased.

The above described processing is performed for each object. The above described steps are repeated until the geometry process is completed for the last data for the polygons which constitute a specific object.

Whether the data is the last available for the polygons which constitute a specific object can be determined as follows. A global flag carrying vertex count information is added at the head of a set of the polygon data which constitute an object. Therefore, the CPU 11 can identify the last data unit by counting the number of vertexes indicated by the global flag.

The global flag also includes determination flag information for deciding whether the geometry process according to the format in this embodiment should be performed, or whether the geometry process according to the conventional beta format should be performed. When, for example, an object is constituted by only a single triangular polygon, is no vertex used in common by the polygon data constituting the object, and accordingly, pointer data are not present. Thus, the determination performed for the data at step S1 in FIG. 4 is not required. It is not preferable that the determination at step S1 be performed because the processing speed is reduced by a time which is equivalent to that required for the determination process.

Figure 5:
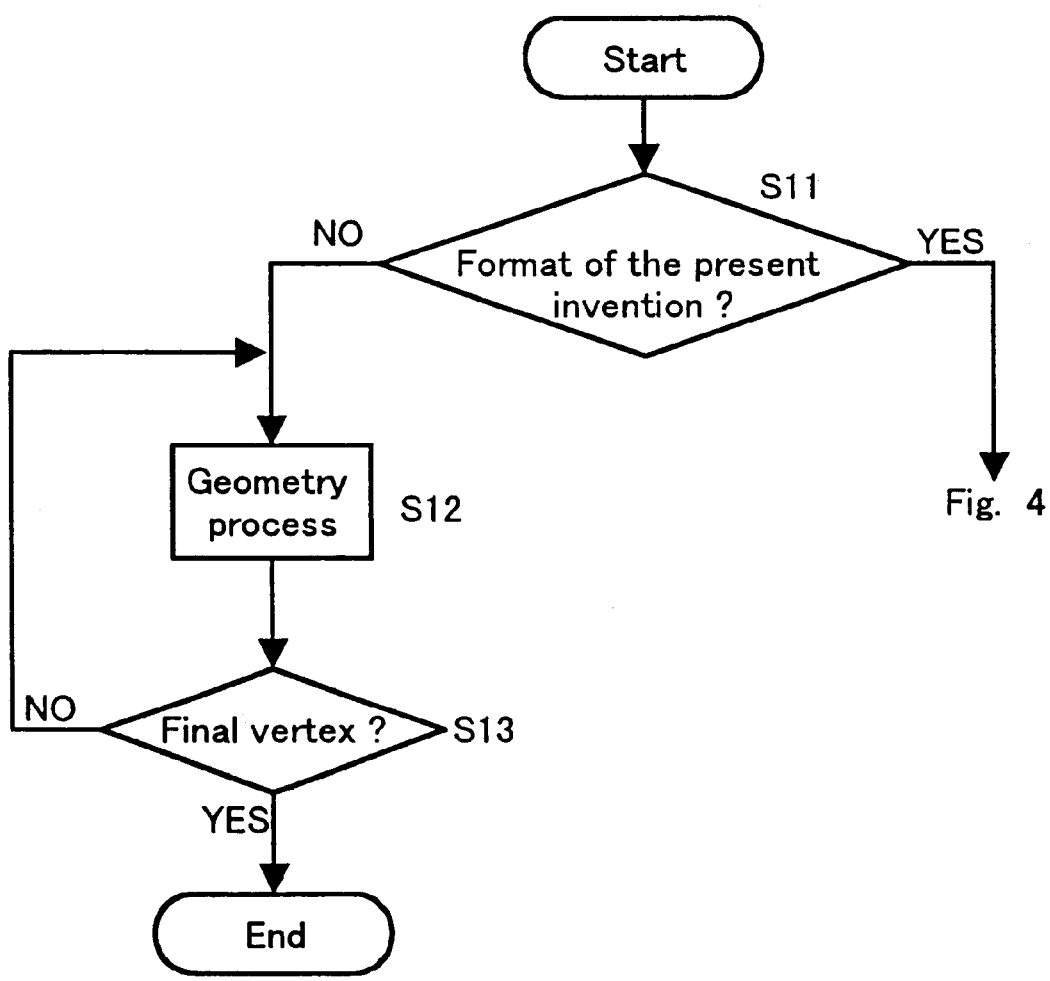
FIG. 5 is a flowchart showing the processing according to another embodiment of the present invention.

Therefore, as is shown in the flowchart in FIG. 5 for another embodiment of the present invention, in the geometry process performed for each object, first, a check is performed to determine whether the polygon data constituting an object will employ the format of the embodiment of the present invention, which includes polygon data and vertex coordinate data, or the conventional beta format, which does not include pointer data (step S11).

When, at step S11, the polygon data for the object is constituted according to the format in this embodiment, the processing in the flowchart in FIG. 4 is performed. When the polygon data for the input object is constituted according to the conventional beta format, step S1 in FIG. 1 is skipped and the CPU 11 calculates vertex coordinate data which are sequentially received (step S12). The process at step 12 is repeated until at step S13 the geometry process is completed for the last vertex coordinate data for the polygons which constitute the object.

The embodiment s of the present invention c an be applied not only for the vertex coordinate data for the vertex data for polygons, but also for color data, luminance data, normal line vector data, or texture address data contained in the vertex data.

As is described above, according to the present invention, when the vertexes of a plurality of polygons which constitute an object are used in common, instead of the overlapping vertex coordinate data, the position data designating the location of the same vertex coordinate data which have been transformed are set to the polygon data, and the vertex coordinate data designated by the position data are read out from the cache memory. Since the amount of position data is smaller than is the amount of vertex coordinate data, the amount of polygon data can be reduced.

Therefore, a larger amount of polygon data can be stored in a data memory (RAM) having a predetermined capacity.

In addition, since a cache memory is employed which can be accessed at high speed by the CPU when performing coordinate transformations, high-speed processing can be maintained.

The present invention may be embodied in other specific forms without departing from the spirit or essential characteristics thereof. The present embodiment is therefore to be considered in all respects as illustrative and not restrictive, the scope of the invention being indicated by the appended claims rather than by foregoing description and all change which come within the meaning and range of equivalency of the claims are therefore intended to be embraced therein.

What is claimed is:

1. An image display method for displaying an object comprising a plurality of polygons each having a plurality of vertices with coordinate data stored in a first memory, the method comprising the steps of:

reading a vertex data from said first memory, said vertex data comprising coordinate data of original vertices and pointers specifying relative addresses between common vertices and coordinate data of associated original vertices in said first memory;

writing the vertex data into a second memory;

if said vertex data is coordinate data of an original vertex, transforming said vertex data; and if said vertex data is a pointer from a common vertex to an original vertex, reading, from said second memory using a relative address stored in said pointer, coordinate data of said original vertex and transforming coordinate data of said original vertex.

2. A graphical apparatus for displaying an object comprising a plurality of polygons each having a plurality of vertices, the apparatus comprising:

a first memory for storing vertex data comprising coordinate data of original vertices and pointers specifying relative addresses between common vertices and coordinate data of associated original vertices in said first memory;

a second memory;

an access means coupled to said first memory and said second memory, wherein said access means
reads a vertex data from said first memory;
writes the vertex data into a second memory;
wherein if said vertex data is coordinate data, transforms said vertex data, and if said vertex data is a pointer from a common vertex to an original vertex, reads, from said second memory using a relative address stored in said pointer, coordinate data of said original vertex, and transforms coordinate data of said original vertex.

3. A graphical apparatus for displaying an object comprising a plurality of polygons each having a plurality of vertices, the apparatus comprising:

a first memory for storing vertex data comprising coordinate data of original vertices and pointers specifying relative addresses between common vertices and coordinate data of associated original vertices in said first memory;

a cache memory;

a processor coupled to said first memory and said cache memory, wherein said processor
reads a vertex data from said first memory;
writes the vertex data into a cache memory; and
wherein if said vertex data is coordinate data, transforms said vertex data, and if said vertex data is a pointer from a common vertex to an original vertex, reads, from said cache memory using a relative address stored in said pointer, coordinate data of said original vertex, and transforms coordinate data of said original vertex.

* * * * *